US006875113B2

(12) United States Patent
Nichols

(10) Patent No.: US 6,875,113 B2
(45) Date of Patent: Apr. 5, 2005

(54) TORSIONAL VIBRATION DAMPER

(75) Inventor: Jeffrey W. Nichols, Pinckney, MI (US)

(73) Assignee: Eagle-Picher Industries, Inc., Cincinnati, OH (US)

( * ) Notice: Subject to any disclaimer, the term of this patent is extended or adjusted under 35 U.S.C. 154(b) by 185 days.

(21) Appl. No.: 09/963,774

(22) Filed: Sep. 26, 2001

(65) Prior Publication Data

US 2003/0060289 A1 Mar. 27, 2003

(51) Int. Cl.$^7$ .............................. F16F 1/126; F16D 3/58
(52) U.S. Cl. ........................ 464/90; 464/903; 474/94; 74/574
(58) Field of Search .............................. 464/83, 85, 87, 464/89, 90, 903, 902, 180; 74/574, 573 R, 572; 474/94

(56) References Cited

U.S. PATENT DOCUMENTS

| | | | | |
|---|---|---|---|---|
| 3,196,710 A | * | 7/1965 | Peirce | 74/574 |
| 3,200,665 A | | 8/1965 | Wells | 74/446 |
| 3,222,953 A | | 12/1965 | Benjamen | 74/574 |
| 3,440,899 A | * | 4/1969 | McGavern et al. | 74/574 |
| 3,495,459 A | * | 2/1970 | McLean | 188/322.5 |
| 4,178,811 A | | 12/1979 | Shepherd | 74/574 |
| 4,302,986 A | | 12/1981 | Shepherd | 74/574 |
| 4,603,997 A | | 8/1986 | Hundt et al. | 403/228 |
| 4,717,370 A | * | 1/1988 | Rohrig | 474/161 |
| 4,722,722 A | | 2/1988 | Rampe | 474/161 |
| 4,899,323 A | * | 2/1990 | Fukahori et al. | 248/560 |
| 5,024,120 A | * | 6/1991 | Andra | 74/572 |
| 5,112,282 A | * | 5/1992 | Patterson | 474/260 |
| 5,377,962 A | | 1/1995 | Ochs et al. | 267/281 |
| 5,449,322 A | | 9/1995 | Wagner | 464/90 |
| 5,452,622 A | | 9/1995 | Fenelon | 74/411 |
| 5,460,356 A | | 10/1995 | Schwibinger | 267/281 |
| 6,293,871 B1 | * | 9/2001 | Geislinger | 464/57 |

* cited by examiner

Primary Examiner—Kenn Thompson
(74) Attorney, Agent, or Firm—Wood, Herron & Evans, L.L.P.

(57) ABSTRACT

A torsional vibration damper mountable to a rotatable shaft. The torsional vibration damper is a composite structure including a body formed of a polymer, such as a glass-reinforced polyamide, that surrounds an insert formed of a structurally-rigid material, such as a metal. The insert includes one or more support flanges that extend radially outward into the polymer body. When the torsional vibration damper is removed from the rotatable shaft, axial forces applied to the damper are transferred by the support flanges to the insert such that the polymer body remains substantially stress-free. In addition to, or instead of, the support flanges, the insert may include torque-locking structure that locks the polymer annular body with the insert to prevent relative rotation therebetween.

16 Claims, 4 Drawing Sheets

TORSIONAL VIBRATION DAMPER

FIELD OF THE INVENTION

The invention relates to torsional vibration dampers and, in particular, to vibration dampers adapted to be mounted on rotatable shafts such as the crankshaft of an internal combustion engine.

BACKGROUND OF THE INVENTION

Torsional vibration dampers are employed extensively in internal combustion engines to reduce torsional vibrations delivered to rotatable shafts. The torsional vibrations may have a considerable amplitude and, if not abated, can potentially damage gears or similar structures attached to the rotatable shaft and cause fatigue failure of the rotatable shaft. Torsional vibration dampers reduce the amplitude of the vibrations by converting the vibrational energy to thermal energy as a result of the damping action. The absorption of the vibrational energy lowers the strength requirements of the rotatable shaft and, therefore, lowers the required weight of the shaft. The torsional vibration damper also has a direct effect on inhibiting vibration of nearby components of the internal combustion engine which would be affected by the vibration.

Virtually all motor vehicles with internal combustion engines incorporate a "serpentine" drive belt system consisting of a single endless drive belt and a series of pulleys. The pulleys derive power from the endless drive belt and operate to drive the various vehicle accessories such as the engine fan, power steering pump, air pumps, air conditioning unit, and the alternator. The endless drive belt that drives each of these pulleys is driven by a drive pulley connected to the crankshaft of the internal combustion engine. To reduce the transfer of vibrations between the crankshaft and the serpentine drive belt system, the drive pulley may comprise a torsional vibration damper that functions to reduces the amplitude or magnitude of the angular vibrations delivered by the crankshaft.

Torsional vibration dampers have been fabricated with a composite central hub consisting of an outer polymeric annular body surrounding an inner metallic insert. Conventional torsional vibration dampers having such composite central hubs are susceptible to irreversible structural damage when removed from the crankshaft to service the internal combustion engine. Typically, a gear puller is utilized which applies a lateral force sufficient to remove or pull the torsional vibration damper from the crankshaft. The applied lateral force is significant in those circumstances in which the torsional vibration damper is frictionally fit to the crankshaft or in which corrosion, deformation, or the like has increased the character of the engagement therebetween. One failure mode is catastrophic mechanical damage to the polymeric material in portions of the annular body grasped by the gear puller. Such mechanical damage can permanently unbalance the annular body and degrade the performance of the torsional vibration damper. Another failure mode is separation of the polymeric annular body from the insert in response to the lateral force applied by the gear puller. In that instance, the annular body is detached from the insert, which remains attached to the rotatable shaft, and the torsional vibration damper is irreversibly damaged.

Another deficiency of conventional torsional vibration dampers is that the polymeric annular body may loosen from the metallic insert and result in breakaway or slip of the annular body relative to the insert. If the torsional vibration damper slips, the transfer of power from the crankshaft to the damper will be reduced in proportion to the slippage and the operation of the vehicle accessories will be impaired. In addition, the torsional vibration damper will no longer operate in an optimum fashion for damping vibrations. In instances of breakaway, the vehicle accessories powered by the belt system will no longer have a drive connection to the engine and become inoperable. As the polymeric material of the damper ages or if the damper is exposed to excess loading, the polymeric annular body is more likely to loosen or decouple from the insert.

The probability that a conventional composite torsional vibration damper will fail during operation, such as by decoupling of the polymeric body from the insert, is increased at elevated operating temperatures. All polymeric solids, including solids formed of crystalline polymers, contain an amorphous portion that experiences a glass transition. At the so-called glass transition temperature, the amorphous polymer changes from a hard, brittle form to a material which is soft and flexible. At higher temperatures, the crystalline portion of the polymer will melt. To maintain a drive connection between the crankshaft and the serpentine drive belt system, the polymer forming the annular body of the torsional vibration damper must remain a hard and brittle solid at the temperature of the operating environment. Polymers utilized in conventional torsional vibration dampers tend to soften and fail in the automotive temperature environment of the crankshaft, which can rise as high as 230° F.

There is a need for a composite torsional vibration damper for a rotatable shaft that can be removed from the shaft without inflicting significant mechanical damage to the damper, that can operate dependably at elevated temperatures, and that will exhibit a reliable mechanical interconnection to prevent rotation of the outer polymeric annular body relative to the inner insert.

SUMMARY OF THE INVENTION

According to the present invention, a composite torsional vibrational damper is provided for mounting to a rotatable shaft. The torsional vibration damper of the present invention is a composite structure including an annular inertia ring, an elastomeric layer disposed radially inward from the inertia ring, a polymer body disposed radially inward from the elastomeric layer, and an insert disposed radially inward from the polymer body. The insert is formed of a structurally rigid material, is mountable to the rotatable shaft, and has a support flange that projects radially outward into the polymer body. An axial force applied to the support flange is preferentially transferred to the insert such that the polymer body remains substantially stress-free. The insert may be optionally provided with multiple support flanges spaced angularly about the outer periphery of the insert and projecting radially outward into the polymer body.

In another embodiment of the present invention, the insert has a torque-locking structure that interlocks the polymer annular body with the insert so as to prevent relative rotation therebetween. The torque-locking structure may comprise protrusions that extend radially outward into the polymer body. The torque-locking structure may be present in addition to the support flanges or the support flanges may be absent.

In other embodiments of the present invention, the polymer body of the torsional vibration damper is formed of a glass-reinforced polyamide. The insert is formed of a metal and has an outer peripheral surface that is generally coextensive with, and engaged for rotation with, an inner peripheral surface of the polymer body. For example, the glass-reinforced polyamide may be a glass-reinforced polyamide that is mechanically stable at a temperature of about 230° F.

By virtue of the foregoing, there is provided a torsional vibration damper that can be removed from a rotatable shaft without inflicting significant mechanical damage to the damper, that can operate dependably at elevated temperatures, and/or that exhibits a reliable mechanical interconnection to prevent rotation of the outer polymeric annular body relative to the inner insert.

The objects and advantages of the present invention will be further appreciated in light of the following detailed description and drawings in which:

DETAILED DESCRIPTION

Figure 1:
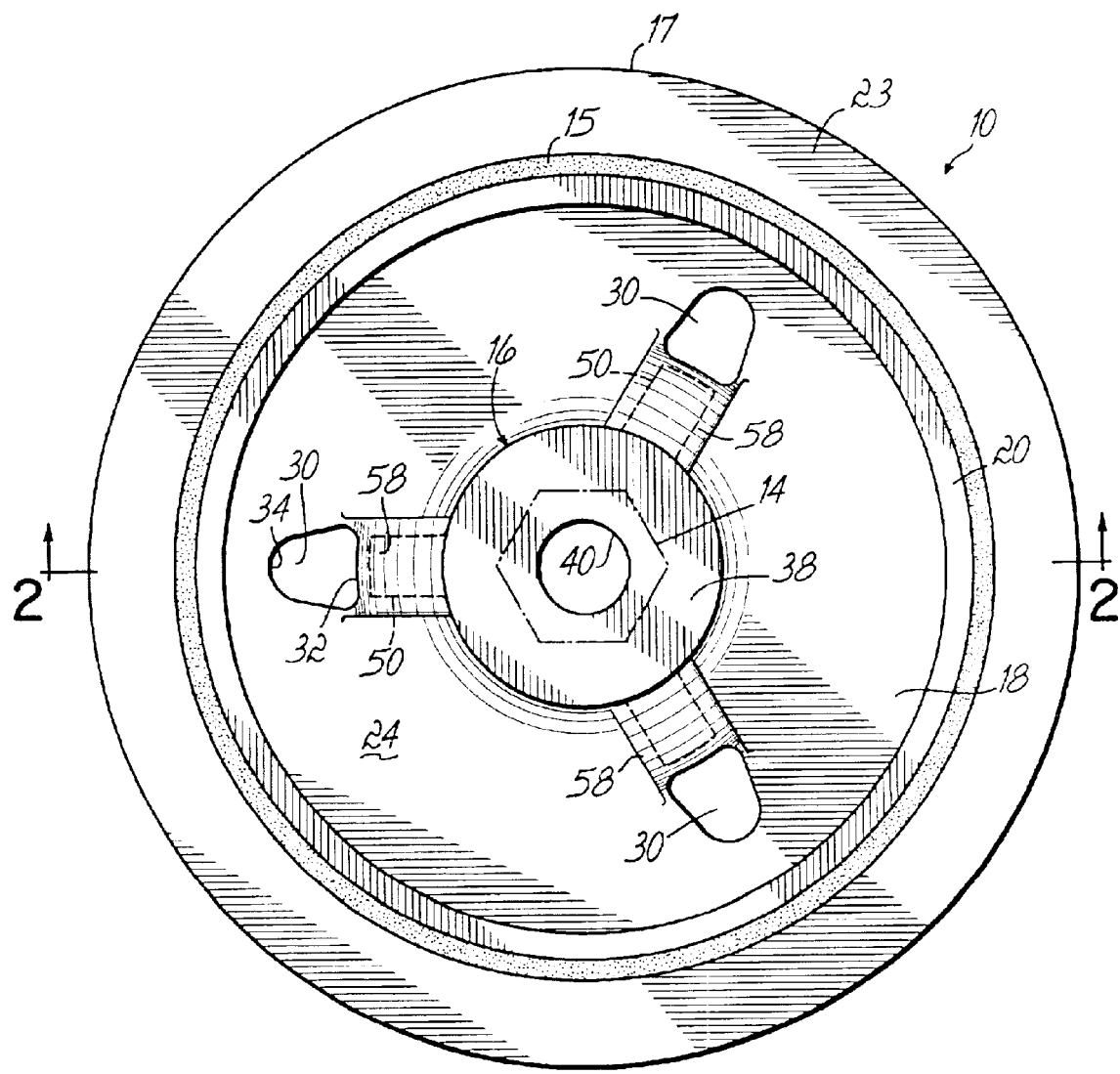
FIG. 1 is an end view of a torsional vibration damper of the present invention.
Figure 2:
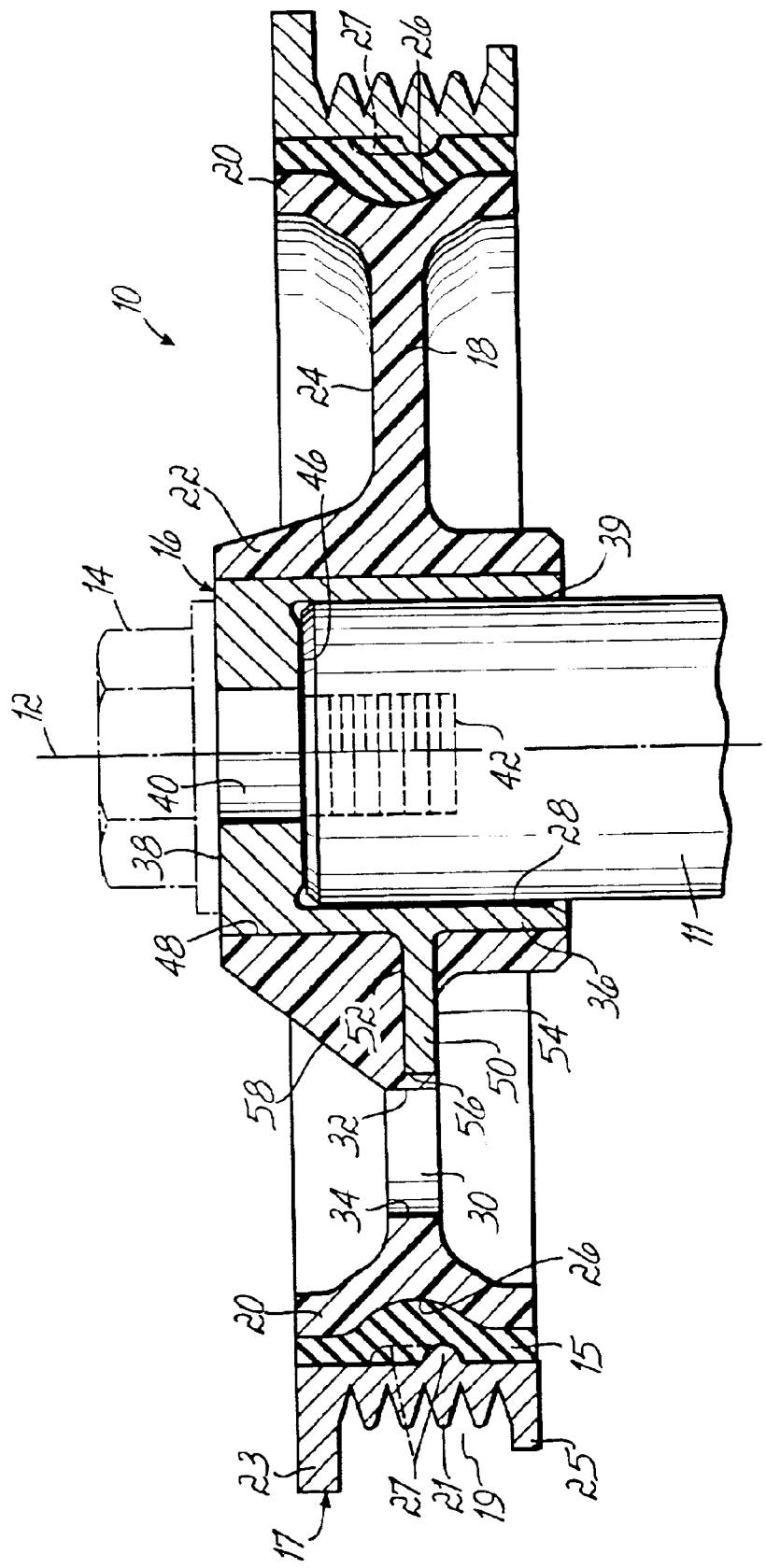
FIG. 2 is a cross-sectional view taken generally along line 2—2 of FIG. 1.

With reference to FIGS. 1 and 2, a torsional vibration damper according to the present invention, and indicated generally by reference numeral 10, is shown mounted to one end of a rotatable shaft, such as a crankshaft 11 of a motor vehicle. The crankshaft 11 is operatively coupled to an internal combustion engine (not shown) and is rotatable about a centerline or longitudinal axis 12 (FIG. 2) thereof by the conventional operation of the internal combustion engine. The torsional vibration damper 10 is affixed with an axial clamp load applied by a washer 13 and a threaded crankshaft fastener 14 (FIG. 1), mounted by a frictional engagement, or a combination thereof to an exposed cylindrical end of the crankshaft 11 so that the damper 10 is non-rotatable with respect to the crankshaft 11. As a result, the torsional vibration damper 10 rotates with the same angular velocity as the crankshaft 11 and participates in transferring rotary power from the crankshaft 11 to other pulleys (not shown) mounted to the internal combustion engine that operate accessory devices of the vehicle. The torsional vibration damper 10 may be used to transfer the axial clamp load from the crankshaft 11 fastener to retain other timing gears and sprockets attached to the crankshaft 11, such as an oil pump gear, a drive sprocket for a cam chain, a timing ring and the like.

With reference to FIGS. 1–4, the torsional vibration damper 10 is an assembly that includes an inner insert 16 formed of a structurally rigid material, an annular body 18 formed or a polymer and disposed radially outward from the inner insert 16, an annular elastomeric layer 15 disposed radially outward from the annular body 18, and an outer inertia ring 17 disposed radially outward from the elastomeric member. The annular elastomeric layer 15 provides the necessary dampening properties and mechanical structure to assemble and locate the inertia ring 17. The elastomeric material forming layer 15 is compounded to a specific formula and frequency that controls the natural response frequency of the torsional vibrations and forcing functions of the crankshaft 11 and the internal combustion engine. The inertia ring 17 is formed of a metal, such as a cast iron, or other suitable materials apparent to persons of ordinary skill.

Disposed about an outer periphery of the inertia ring 17 is a driving surface or belt-engaging portion 19 which includes a plurality of spaced-apart corrugations or ribs 21 positioned axially between a pair of guides 23 and 25. The ribs 21 extend about the circumference of inertia ring 17 so as to define a plurality of grooves configured and dimensioned to drivingly couple with a Poly-V belt (not shown). Such Poly-V belts are used, for example, as serpentine belts in motor vehicles to transfer power from the crankshaft to vehicle accessories such as the engine fan, power steering pump, air pumps, air conditioning unit, and the alternator. It is understood that the belt-engaging portion 19 may be configured as a pulley for engaging a drive belt, such as a V-belt having an inverted trapezoidal cross-sectional profile. In other embodiments, the inertia member 17 may be configured as a sprocket or gear for engaging a drive chain in which the belt-engaging portion 19 includes a plurality of circumferentially-spaced teeth arranged about the outer periphery of the inertia ring 17. Guides 23 and 25 also encircle the inertia ring 17 and project radially outward beyond the crests of the ribs 21. Guides 23 and 25 provide shoulders that limit the range of longitudinal travel of the Poly-V belt as the torsional vibration damper 10 is rotated by crankshaft 11.

With continued reference to FIGS. 1–4, a circumferential flange 27 projects radially inward from an inner periphery of the inertia ring 17. Flange 27 provides centrality location of the inertia ring 17 and participates in providing axial retention of the inertia ring 17 in a direction generally parallel to the longitudinal axis 12 (FIG. 2) of the inertia ring 17. The flange 27 is illustrated in FIG. 2 as tracing a sinusoidal path with axial convolutions, indicated in dashed lines, directed generally parallel to the longitudinal axis 12 about the inner circumference of the inertia ring 17 but is not so limited. In other embodiments, flange 27 may trace a substantially linear or straight path about the inner circumference of the inertia ring 17 and lack the axial convolutions. The cross-sectional profile, viewed parallel to the path, of the flange 27 may, without limitation, be rectangular, semicircular, or other various common geometrical shapes.

The annular body 18 includes an outer peripheral flange 20, an inner peripheral flange 22, and a radially-extending, annular connecting wall 24 that joins the inner peripheral flange 22 to the outer peripheral flange 20. A circumferential outer edge of the outer peripheral flange 20 includes a circumferential channel 26 filled by a portion of the elastomeric layer 15. The surface finish of the circumferential channel 26 may be altered by providing structure (not shown), such as a knurl, inward recesses or outward projections, to enhance the positive engagement of the elastomeric layer 15 with the annular body 18. The interior of the inner peripheral flange 22 has a substantially cylindrical, radially-inwardly facing inner surface 28 which defines a cylindrical bore dimensioned and configured to receive the insert 16.

The annular body 18 further includes a plurality of, for example, three service ports 30 that extend through the thickness of the connecting wall 24. The service ports 30 are angularly spaced relative to each other about the circumference of the connecting wall 24 and, preferably, are symmetrically arranged with substantially equal angular spacings, such as the 120° spacing illustrated in FIG. 1. The service ports 30 are positioned radially outward from the inner surface 28 with a substantially uniform radial spacing. The service ports 30 are utilized in a procedure that removes the torsional vibration damper 10 from the end of the crankshaft 11, as will be discussed below. Each of the service ports 30 has a curved radially-innermost edge 32 that is oriented approximately tangent to the inner surface 28 of the inner peripheral flange 22 and a radially-outermost curved edge 34. Access to a central open region of each service port 30 is unobstructed by any portion of either the annular body 18 or the insert 16.

With continued reference to FIGS. 1–4, the insert 16 includes a substantially cylindrical side wall 36 having an open end and a closed end occupied by an end wall 38 which is integrally joined with the side wall 36. The side wall 36 and end wall 38 collectively define a cup-shaped chamber 39, as best shown in FIG. 3. The cup-shaped chamber 39 has an inside diameter dimensioned substantially equal to the outside diameter of the cylindrical end of the crankshaft 11 and an outside diameter substantially equal to the diameter of the cylindrical inner surface 28 of the inner peripheral flange 22. Centrally provided in the end wall 38 is a bore 40 adapted to receive a conventional threaded fastener 14 (FIG. 1) for securing the torsional vibration damper 10 to a threaded opening 42 in the end of the crankshaft 11. It is apparent to those of ordinary skill in the art that the torsional vibration damper 10 may be mounted in a frictional or interference fit in addition to or in instead of the illustrated fastener attachment. An inner annular surface 46 of the end wall 38 provides a mechanical stop that limits the longitudinal travel of the crankshaft 11 when the crankshaft 11 is inserted into the chamber 39. A radially-outermost cylindrical surface 48 of the side wall 36 is generally coextensive with the cylindrical inner surface 28 of the inner peripheral flange 22 of the annular body 18. Preferably, the inner surface 28 of the annular body 18 and the outer surface 48 of the insert 16 are substantially concentric or coaxial.

Figure 3A:
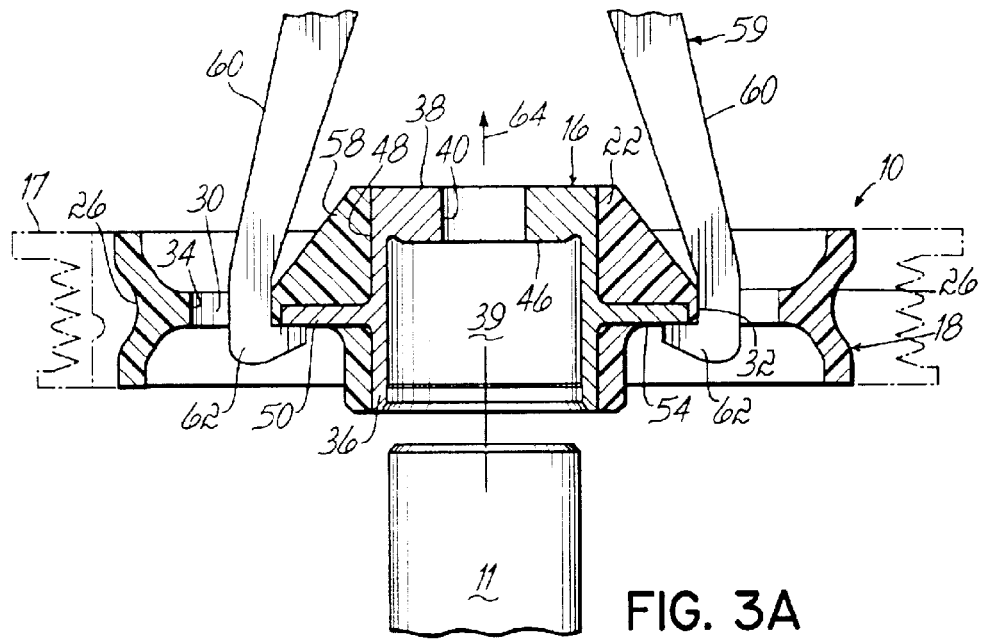
FIG. 3 is a cross-sectional view similar to FIG. 2 illustrating the removal of the torsional vibration damper from a crankshaft to which it is removably mounted when in use.
Figure 4:
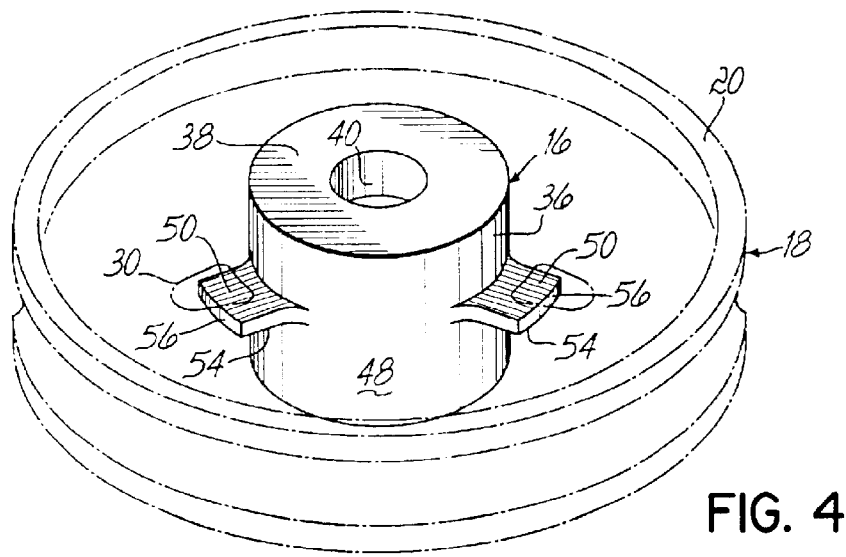
FIG. 4 is a perspective view of the torsional vibration damper of FIG. 1 in which the polymeric annular body is shown in dot-dashed lines and the inertia ring and elastomeric layer are omitted.

According to one aspect of the present invention and with reference to FIGS. 2–4, the torsional vibration damper 10 includes a plurality of, for example, three support flanges 50 that are angularly spaced about the circumference of the insert 16. Generally, the number of support flanges 50 corresponds to the number of service ports 30 and each of the support flanges 50 is located at an angular position about the circumference of insert 16 that coincides with the angular position of one of the service ports 30. Preferably, the support flanges 50 are symmetrically arranged with respect to each other and have substantially equal angular spacings, such as the illustrated 120° spacing. The angularly-spaced support flanges 50 extend radially outwardly from the radially-outermost surface 48 of the side wall 36. Each support flange 50 includes a first surface 52, an opposite and substantially parallel second seating surface 54 separated from the first surface 52 by the thickness of flange 50, and an arcuate radially-outermost rim 56 interconnecting the first surface 52 with the second seating surface 54. The support flanges 50 are illustrated as having a substantially uniform rectangular cross-section viewed along a radial direction. However, differing uniform and non-uniform cross-sections, such as tapered cross-sections, for the support flanges 50 are within the spirit and scope of the present invention. The support flanges 50 may be integrally formed with the insert 16 by a traditional metalworking process such machining, forging, casting or powder metallurgy. In the alternative, the support flanges 50 may be affixed to the radially-outermost surface 48 of the insert 16 by soldering, welding, adhesive bonding, or the like.

Figure 4A:
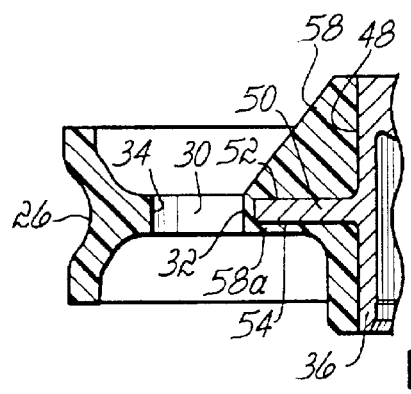
FIG. 4A is a cross-sectional view, similar to a portion of FIG. 2, showing an alternative embodiment of an insert for a torsional vibration damper according to the present invention.

Each support flange 50 is aligned radially with the radially-extending centerline of one of the service ports 30 such that the radially-outermost rim 56 of each support flange 50 is located radially adjacent to or coextensive with the radially-innermost edge 32 of one of the service ports 30. Each support flange 50 is partially encapsulated within the polymer forming the annular body 18. The seating surface 54 of each support flange 50 is illustrated in FIG. 2 as being substantially not covered by, or substantially free of, the polymer material of the annular body 18. In other embodiments, as shown in FIG. 4A, each of the support flanges 50 may be totally encapsulated within the polymer forming the annular body 18 so that a thin layer of polymer 58a overlaps the seating surface 54 of each support flange 50.

As best shown in FIGS. 1 and 2, the inner peripheral flange 22 of the annular body 18 includes a plurality of frustoconical portions 58 having an enhanced radial dimension. Each of the plurality of frustoconical portions 58 increases in thickness in a direction from the first surface 52 of one of the support flanges 50 toward the longitudinal axis 12. One of the plurality of frustoconical portions 58 is disposed radially inwardly of the radially-innermost edge 32 of the corresponding one of the service ports 30. Each frustoconical portion 58 extends over an arc angle substantially similar to the arc angle subtended by the corresponding one of the support flanges 50.

In use, the torsional vibration damper 10 is mounted to the crankshaft 11 as illustrated in FIG. 2. The clamp load provided by washer 13 and threaded crankshaft fastener 14 retains the torsional vibration damper 10 to the crankshaft 11. The axial clamp load is transferred through the compressive joint provided by insert 16 to other timing gears and sprockets attached to the crankshaft 11. As the crankshaft 11 rotates, the torsional vibration damper 10 transfers rotary power to, for example, the serpentine belt drive system powering vehicle accessories and isolates the crankshaft 11 from torsional vibrations. With reference to FIG. 3, the torsional vibration damper 10 is removable from the end of the crankshaft 11 with the assistance of a tool known as a gear puller 59. The gear puller 59 permits the torsional vibration damper 10 to be pulled from the crankshaft 11 without damage so that the damper 10 can be reused. The gear puller 59 includes a plurality of, for example, three substantially-parallel arms 60 in which adjacent ones of the arms 60 are separated by an angular spacing that roughly corresponds to the angular spacing between adjacent ones of the service ports 30 in the annular body 18 of the torsional vibration damper 10. Positioned at one end of each arm 60 is a hook-shaped jaw member 62. The arms 60 are extended through the service ports 30 and are moved radially inward so that each of the jaw members 62 is positioned in a radial position and with a circumferential orientation that is directly adjacent the seating surface 54 of one of the support flanges 50. A substantially flat surface of each jaw member 62 is brought into an abutting contact with the adjacent one of the seating surfaces 54. The gear puller 59 further includes a mechanism (not shown), such as a yoke and a large threaded bolt which passes through the center of the yoke, from which the arms 60 extend. The mechanism provides the movement which applies a lateral force directed in the general direction of arrow 64 so as to remove the torsional vibration damper 10 from the crankshaft 11. Each jaw member 62 engages the seating surface 54 of one of the support flanges 50.

As the torsional vibration damper 10 is displaced laterally along the length of the end of the crankshaft 11 in a direction operable to remove the damper 10 from crankshaft 11, the lateral force applied by the jaw members 62 is principally exerted against the seating surface 54 of each support flange 50. The applied force is transferred from the support flanges 50 to the insert 16, which is urged to slide from the crankshaft 11 in a direction substantially collinear with the direction 64 of the applied force. The preferential transfer of the applied force to the insert 16 significantly reduces, eliminates, or otherwise limits the fraction of the lateral force applied and/or transferred to the polymer material forming the annular body 18. The lateral force is preferentially transferred by the support flanges 50 to the insert 16 such that the polymer material of the annular body 18 remains substantially free of stress. Therefore, the probability of damaging the annular body 18 during the removal procedure is significantly reduced and it is more likely that the torsional vibration damper 10 may be reused after removal.

According to one aspect of the present invention, the structurally rigid material forming the insert 16, including the support flanges 50, is a metal. The support flanges 50 are created on the outer surface of the insert 16 by a traditional metalworking process such machining, forging, casting or powder metallurgy or, in the alternative, are separate structures affixed to the radially-outermost surface 48 of the insert 16 by soldering, welding, adhesive bonding, or the like. The annular body 18 is formed of a polymer that is mechanically stable at the ambient, operating temperatures found in the environment of the crankshaft 11 in an internal combustion engine. One polymer which has been found particularly suitable for use in forming the annular body 18 is a polyamide composite having a reinforcing filler of a relatively rigid material, such glass, ceramic or carbon. The reinforcing filler may have the form of fibers or other suitable geometrical forms as are familiar to those of ordinary skill in the art.

An exemplary family of glass-reinforced polyamides based on a nylon copolymer is manufactured and sold by Dupont under the tradename ZYTEL® HTN. This exemplary family of glass reinforced polyamides is specifically formulated to offer improved heat aging and retain strength and stiffness at elevated temperatures. Therefore, such glass-reinforced polyamides are compatible with an application in which the torsional vibration damper 10 is mounted to a crankshaft 11 in an internal combustion engine. Of particular use in the present invention are a 50% glass reinforced, heat stabilized, lubricated toughened high performance polyamide resin marketed as ZYTEL® HTN54G50HSLR NC010 and a 45% glass reinforced, heat stabilized, lubricated high performance polyamide resin marketed as ZYTEL® HTN51G45HSLR NC010. According to the manufacturer, the latter polyamide resin has a glass transition temperature of about 286° F. (141° C.) and a melting point of about 572° F. (300° C.). The glass transition temperature of the latter polyamide resin exceeds the ambient service temperature of about 180° F. to about 230° F. that occurs within a typical internal combustion engine in a location near the crankshaft 11. Therefore, a torsional vibration damper 10 having a polymer annular body 18 formed of such high performance polyamide resins is expected to exhibit good dimensional stability and creep resistance. Other materials having similar characteristics and which meet the preceding criteria are contemplated by the present invention.

The utilization of the composite structure of the annular body 18 and the insert 16 reduces the mass of the torsional vibration damper 10 by replacing the portions of a conventional metal construction with a lighter-weight polymer construction. The presence of the insert 16 is beneficial in instances in which the torsional vibration damper 10 has an interference fit with the end of the crankshaft 11. In those cases, the strength and properties for elongation/expansion of the interior diameter of the insert 16 provides axial and torsional load retention to the crankshaft 11 with which the insert 16 has the interference fit. The insert 16 further serves as a compression joint by transferring the axial clamp load applied by the crankshaft 11 fastener to connect the torsional vibration damper 10 to the crankshaft 11.

The polymer annular body 18 is formed about the exterior of the insert 16 by a conventional method such as compression molding. Generally, compression molding is a method of molding thermosetting polymer compounds in which a thermoplastic molding powder is placed into a mold cavity of a heated mold. The mold cavity is then closed and the thermoplastic material is cured or hardened in the closed mold cavity under pressure. Another conventional method of assembling the insert 16 and the polymer annular body 18 is injection molding in which a softened thermoplastic material is forced or squirted out of a heated cylinder by a plunger into a water-cooled mold cavity. In either forming method, the insert 16 is located near the center of the mold cavity before the molding powder is added or the thermoplastic is injected, as may be the case. The ability to form the assembly of the polymer annular body 18 and the insert 16 by such methods provides a net-shape or near-net-shape product that requires little or no additional machining, which significantly reduces the manufacturing cost. The assembly of the polymer annular body 18 and insert 16 is next centered relative to the inertia ring 17 and the elastomeric layer 15 is added to the assembly by pressing, chemical bonding, injection molding or another conventional method so as to complete the fabrication of the torsional vibration damper 10 of the present invention.

Figure 5:
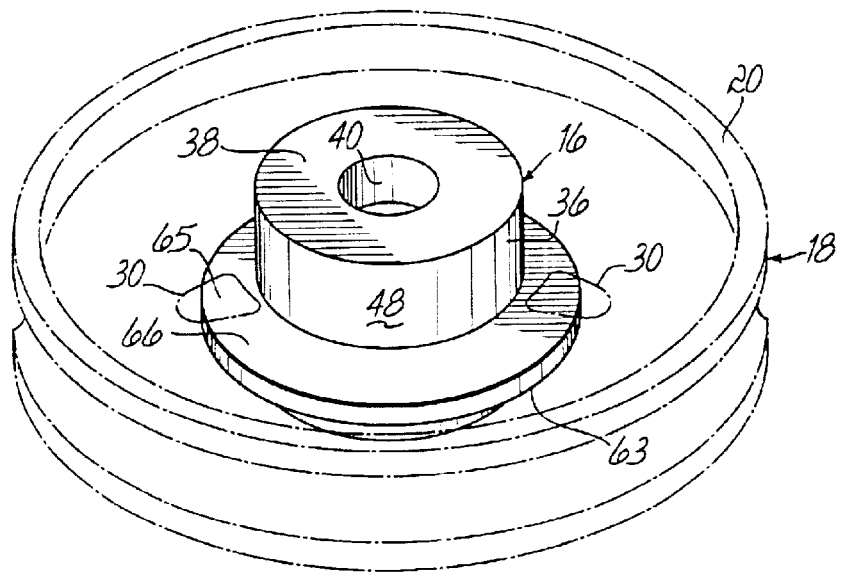
FIG. 5 is a cross-sectional view similar to FIG. 4 of an alternative embodiment of an insert for a torsional vibration damper according to the present invention.

With reference to FIG. 5 in which like reference numerals refer to like features, an alternative embodiment of the torsional vibration damper 10 includes a support flange 61, preferably formed of a structurally rigid material such as a metal, which projects radially outward from the cylindrical surface 48 of the side wall 36 of insert 16 and into the polymer material forming the annular body 18. The service ports 30 in annular body 18 are radially disposed proximate to the support flange 61. The support flange 61 extends about the circumference of the side wall 36 and is integrally formed with the insert 16 by a traditional metalworking process such machining, forging, casting or powder metallurgy. In other embodiments, the support flange 61 may be a separate component affixed to the radially-outermost surface 48 of the insert 16 by soldering, welding, adhesive bonding, or the like. The support flange 61 includes an annular seating surface 63 and an opposite annular surface 65 which are separated by the thickness of flange 61. The seating surface 63 may be free of the polymer material forming the polymer body 18 or may be at least partially encapsulated in the polymer material forming the annular body 18. When the torsional vibration damper 10 is removed from the crankshaft 11 (FIG. 3A), the support flange 61 functions in a manner analogous to support flanges 50 (FIGS. 1–4) and as described in detail above. Specifically, the lateral force applied by the gear puller 59 is preferentially transferred by the support flange 61 to the insert 16 such that the polymer material of the annular body 18 remains substantially free of stress during a procedure in which the torsional vibration damper 10 is removed from crankshaft 11, as shown in FIG. 3A.

According to one aspect of the present invention, the torsional vibration damper 10 may be provided with torque-locking structure that structurally and mechanically interlocks the polymer annular body 18 with the insert 16 so that the annular body 18 resists rotation relative to the insert 16 in either direction of rotation. The torque-locking structure also participates in preventing, or at least limiting, relative axial movement of the insert 16 relative to the annular body 18.

Figure 6:
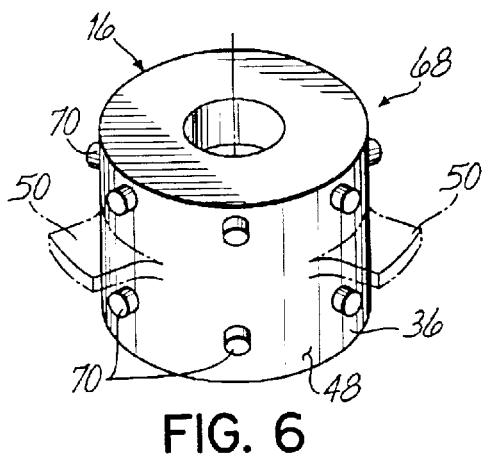
FIG. 6 is a perspective view of an alternative embodiment of an insert for a torsional vibration damper according to the present invention.

With reference to FIG. 6 in which like reference numerals refer to like features in FIGS. 1–4, a torsional vibration damper 68 has torque-locking structure according to one embodiment of the present invention comprising a plurality of bosses 70 projecting radially outwardly from the radially-outermost surface 48 of the insert 16. The bosses 70 are arranged about the radially-outermost surface 48 of the insert 16 such that adjacent bosses 70 have an angular spacing, such as the approximately uniform angular spacing illustrated in FIG. 6. It is apparent that the present invention is not so limited to uniform angular spacings and that the bosses 70 may be located anywhere along the radially-outermost surface 48 without limitation. The bosses 70 may be integrally formed with the insert 16 by a traditional metalworking process such machining, forging, casting or powder metallurgy. In the alternative, the bosses 70 may be separate structures affixed to the radially-outermost surface 48 of the insert 16 by soldering, welding, adhesive bonding, or the like. The bosses 70 are illustrated in FIG. 6 as being cylindrical with a uniform circular cross-section viewed along a radial direction. Those of ordinary skill in the art will appreciate that differing uniform and non-uniform cross-sections, such as tapered, are contemplated by the present invention. A plurality of support flanges 50 may also be provided, as illustrated in FIG. 6 in dot-dashed lines, which extend radially outwardly from the surface of the insert 16 and that are utilized, as described above, for removing the torsional vibration damper 10 from the crankshaft 11 (FIG. 2).

Figure 7:
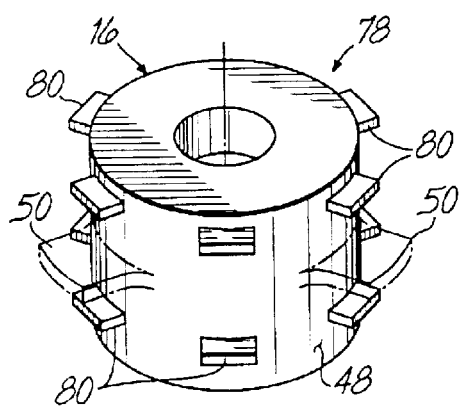
FIG. 7 is a perspective view of an another alternative embodiment of an insert for a torsional vibration damper according to the present invention.

With reference to FIG. 7 in which like reference numerals refer to like features in FIGS. 1–4, a torsional vibration damper 78 has torque-locking structure according to one embodiment of the present invention comprising a plurality of tabs 80 projecting outwardly from the radially-outermost surface 48 of the insert 16. Each of the tabs 80 extends for an angular arc about the circumference of the insert 16. The tabs 80 are arranged about the radially-outermost surface 48 of the insert 16 so that adjacent tabs 80 have an angular spacing, such as the approximately uniform angular spacing illustrated in FIG. 7. It is apparent that the present invention is not so limited to equal angular spacings and that the tabs 80 may be located anywhere along the radially-outermost surface 48 without limitation. The tabs 80 may be integrally formed with the insert 16 by a traditional metalworking process such machining, forging, casting or powder metallurgy or, in the alternative, may be separate structures affixed to the radially-outermost surface 48 of the insert 16 by soldering, welding, adhesive bonding, or the like. A plurality of support flanges 50 may also be provided, as illustrated in FIG. 7 in dot-dashed lines, which extend radially outwardly from the radially-outermost surface 48 of the insert 16 and that are utilized, as described above, for removing the torsional vibration damper 10 from the crankshaft 11, as illustrated in FIG. 2.

Figure 8:
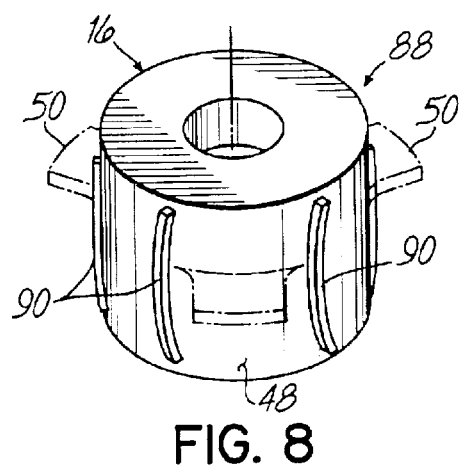
FIG. 8 is a perspective view of another alternative embodiment of an insert for an torsional vibration damper according to the present invention.

With reference to FIG. 8 in which like reference numerals refer to like features in FIGS. 1–4, a torsional vibration damper 88 has torque-locking structure according to one embodiment of the present invention comprising a plurality of curved vanes or splines 90 that are attached to the radially-outermost surface 48 of the insert 16. The splines 90 project radially outwardly from the radially-outermost surface 48 of the insert 16 and extend substantially parallel to a longitudinal axis of the insert 16. The splines 90 are arranged about the outer surface of the insert 16 so that adjacent projections have an angular spacing, such as the approximately equal angular spacing illustrated in FIG. 8. It is apparent that the present invention is not so limited to equal angular spacings and that the splines 90 may be located anywhere along the radially-outermost surface 48 without limitation. The splines 90 may be integrally formed with the insert 16 by a metalworking process such machining or casting or, in the alternative, may be separate structures affixed to the radially-outermost surface 48 of the insert 16 by soldering, welding, adhesive bonding, or the like. A plurality of support flanges 50 may also be provided, as illustrated in FIG. 8 in dot-dashed lines, which extend radially outwardly from the radially-outermost surface 48 of the insert 16 and that are utilized, as described above, for removing the torsional vibration damper 10 from the crankshaft 11 (FIG. 2).

While the present invention has been illustrated by a description of various preferred embodiments and while these embodiments have been described in considerable detail in order to describe the best mode of practicing the invention, it is not the intention of applicant to restrict or in any way limit the scope of the appended claims to such detail. Additional advantages and modifications within the spirit and scope of the invention will readily appear to those skilled in the art.

The invention itself should only be defined by the appended claims, wherein I claim:

1. The torsional vibration damper for a rotatable shaft, comprising:

an annular inertia ring;

an elastomeric layer disposed radially inward from the inertia ring;

a polymer body disposed radially inward from the elastomeric layer, the polymer body including a radially-extending annular wall with opposed annular surfaces, an inner edge connecting the opposed annular surfaces to define a central bore, and a plurality of service ports extending through the radially-extending wall between the opposed annular surfaces; and an insert disposed in the central bore radially inward from the inner edge of the polymer body, the insert having a rotational axis when mounted to the rotatable shaft, the insert including a plurality of support flanges projecting radially outward into the polymer body, adjacent ones of the suppor having a n angular spacing about a circumference of the insert, each of the support flanges and a corresponding one of the service ports being substantially aligned along one of a plurality of radial lines extending from said rotational axis and each of the service ports positioned radially outward along one of the radial lines from a corresponding one of the support flanges, and wherein an axial force applied to support flanges, when the insert is mounted to the rotatable shaft, is transferred to the insert for reducing a portion of the axial force transferred to the polymer body.

2. The torsional vibration damper of claim 1 wherein each of the plurality of support flanges further comprises a seating surface that is substantially coextensive with one of the first and the second surfaces of the polymer body.

3. The torsional vibration damper of claim 2 wherein the seating surface of each of the support flanges is free of a polymer material forming the polymer body.

4. The torsional vibration damper of claim 2 wherein the seating surface of each of the support flanges is at least partially encapsulated in a polymer material forming the polymer body.

5. The torsional vibration damper of claim 1 wherein the polymer body comprises a glass reinforced polyamide.

6. The torsional vibration damper of claim 1 wherein the polymer body comprises a polymer material that is mechanically stable at a temperature of at least about 230° F.

7. The torsional vibration damper of claim 1 wherein the the insert is formed from a metal.

8. The torsional vibration damper of claim 1 wherein the annular inertia ring including a circumferential flange that extends radially inward into the elastomeric layer.

9. A hub mountable to a rotatable shaft, comprising:
an annular polymer body having a radially-extending annular wall with opposed annular surfaces, an inner edge connecting the opposed annular surfaces to define a central bore, and a plurality of service ports extending through the radially-extending wall between the opposed annular surfaces; and
and insert disposed in the central bore radially inward from the inner edge of the polymer body, the insert including a plurality of support flanges projecting radially outward into the polymer body, adjacent ones of the support flanges having an angular spacing about a circumference of the insert, the insert having a rotational axis when mounted to the rotatable shaft, and each of the support flanges being substantially aligned with a corresponding one of the service ports along one of a plurality of radial lines extending from the rotational axis and each of the service ports being positioned radially outward along one of the radial lines from a corresponding one of the support flanges, wherein an axial force applied to support flanges, when the insert is mounted to the rotatable shaft, is transferred to the insert for reducing a portion of the axial force transferred to the polymer body.

10. The hub of claim 9 wherein each of the support flanges further comprises a seating surface that is substantially coextensive with one of the first and the second annular surfaces of the polymer body.

11. The hub of claim 10 wherein the seating surface is free of a polymer material forming the polymer body.

12. The hub of claim 10 wherein the seating surface is at least partially encapsulated in a polymer material forming the polymer body.

13. The hub of claim 9 wherein the polymer body comprises a polymer material that is mechanically stable at a temperature of at least about 230° F.

14. The hub claim 9 wherein the the insert is formed from a metal.

15. The hub of claim 9 wherein the annular inertia ring including a circumferential flange that extends radially inward into the elastomeric layer.

16. The hub of claim 9 wherein the polymer body comprises a glass reinforced polyamide.

* * * * *

UNITED STATES PATENT AND TRADEMARK OFFICE
CERTIFICATE OF CORRECTION

PATENT NO. : 6,875,113 B2
DATED : April 5, 2005
INVENTOR(S) : Jeffrey W. Nichols It is certified that error appears in the above-identified patent and that said Letters Patent is hereby corrected as shown below:

Column 1,
Line 39, change "reduces" to -- reduce --.

Column 3,
Line 39, remove "an.".
Line 44, change "an" to -- a --.

Column 4,
Line 8, change "or" to -- of --.

Column 6,
Line 12, after "such" add -- as --.

Column 7,
Lines 38 and 48, after "such" add -- as --.

Column 8,
Line 20, change "provides" to -- provide --.
Line 62, after "such" add -- as --.

Column 9,
Line 38, after "such" add -- as --.

Column 10,
Lines 1 and 27, after "such" add -- as --.
Line 48, change "The" to -- A --.
Line 65, change "suppor" to -- support --, and after "support" add -- flanges --.
Line 65, change "a n" to -- an --.

UNITED STATES PATENT AND TRADEMARK OFFICE
CERTIFICATE OF CORRECTION

PATENT NO. : 6,875,113 B2
DATED : April 5, 2005
INVENTOR(S) : Jeffrey W. Nichols It is certified that error appears in the above-identified patent and that said Letters Patent is hereby corrected as shown below:

Column 11,
Line 6, after "to" add -- the --.
Lines 26-27, delete the second occurrence of "the.".
Line 29, change "including" to -- includes --.

Column 12,
Line 1, change "and" to -- an --.
Line 14, after "to" insert -- the --.
Line 30, after "hub" insert -- of --.
Line 33, change "including" to -- includes --.

Signed and Sealed this

Twenty-fifth Day of October, 2005

JON W. DUDAS
*Director of the United States Patent and Trademark Office*